United States Patent
Yim

(10) Patent No.: US 7,849,822 B2
(45) Date of Patent: Dec. 14, 2010

(54) RECIPROCATING ROTATION TYPE ENGINE AND POWER TRANSFERRING DEVICE AND HYBRID SYSTEM USING THE SAME

(75) Inventor: Jin Whan Yim, Gyeonggi-do (KR)

(73) Assignee: Aden Limited, Gyeonggi-do (KR)

( * ) Notice: Subject to any disclaimer, the term of this patent is extended or adjusted under 35 U.S.C. 154(b) by 577 days.

(21) Appl. No.: 11/918,071

(22) PCT Filed: Apr. 20, 2006

(86) PCT No.: PCT/KR2006/001480
§ 371 (c)(1),
(2), (4) Date: Oct. 9, 2007

(87) PCT Pub. No.: WO2006/112671
PCT Pub. Date: Oct. 26, 2006

(65) Prior Publication Data
US 2009/0084345 A1    Apr. 2, 2009

(30) Foreign Application Priority Data
Apr. 21, 2005    (KR) .................... 10-2005-0033039

(51) Int. Cl.
| F02B 53/00 | (2006.01) |
| F04C 18/00 | (2006.01) |
| F04C 2/00 | (2006.01) |
| F16H 3/72 | (2006.01) |
| F16H 37/06 | (2006.01) |
| F16H 1/28 | (2006.01) |
| F16H 3/44 | (2006.01) |
| F16H 37/00 | (2006.01) |

(52) U.S. Cl. .................... 123/18 R; 123/241; 123/245; 418/165; 418/225; 475/5; 475/11; 475/287; 475/330; 74/15.86

(58) Field of Classification Search ............... 123/241, 123/245, 206, 228, 18 R, 18 A; 418/68, 35–38, 418/165, 225; 475/5, 11, 287, 330; 180/65.29, 180/65.25, 65.31; 290/40 C
See application file for complete search history.

(56) References Cited

U.S. PATENT DOCUMENTS 1,010,583 A * 12/1911 Carmichael et al. ....... 123/18 R
1,013,885 A *  1/1912 McConnell ............... 123/228

(Continued)

FOREIGN PATENT DOCUMENTS

DE    3127498 A1 *  4/1983

(Continued)

*Primary Examiner*—Thai Ba Trieu
(74) *Attorney, Agent, or Firm*—Rosenberg, Klein & Lee

(57) ABSTRACT

A reciprocating rotary engine includes a torus-shaped chamber which is divided into two regions. Each divided region forms a sealed chamber. Each sealed chamber is divided by a piston attached to a shaft whereby four sealed chambers are formed. A power converter includes two power combination devices and two motor/generator dual role electric motors. Each combination device has three rotational axes with the torques of two axes being combined together and transferred to the remaining axis. The two electric motors modulate the torque of an axis periodically in accordance with reciprocating rotary motion of the engine, to provide a counterforce to oscillating power and transfer unidirectional torque to a drive shaft.

14 Claims, 14 Drawing Sheets

U.S. PATENT DOCUMENTS

| | | | | |
|---|---|---|---|---|
| 1,490,820 A * | 4/1924 | Gross | | 123/18 R |
| 1,737,082 A * | 11/1929 | Gough | | 123/18 R |
| 1,744,542 A * | 1/1930 | Gough | | 123/18 R |
| 1,799,294 A * | 4/1931 | Gough | | 123/18 R |
| 1,802,650 A * | 4/1931 | Helmlinger | | 123/18 R |
| 2,043,544 A * | 6/1936 | Kempthorne | | 123/241 |
| 2,068,570 A * | 1/1937 | Ross | | 418/225 |
| 2,399,008 A * | 4/1946 | Doran | | 418/165 |
| 3,408,991 A * | 11/1968 | Davis | | 123/18 R |
| 3,429,200 A * | 2/1969 | Green | | 475/330 |
| 3,435,711 A * | 4/1969 | Kakei | | 475/287 |
| 3,476,056 A * | 11/1969 | Bright | | 418/34 |
| 4,027,475 A | 6/1977 | Folsom | | 123/18 R |
| 4,029,060 A | 6/1977 | Dane | | 123/18 R |
| 4,599,976 A * | 7/1986 | Meuret | | 123/18 R |
| 5,228,414 A | 7/1993 | Crawford | | 123/18 R |
| 5,309,778 A * | 5/1994 | Antonov | | 74/15.86 |
| 5,429,085 A * | 7/1995 | Stauffer | | 123/245 |
| 6,306,057 B1 * | 10/2001 | Morisawa et al. | | 475/5 |
| 6,828,691 B2 * | 12/2004 | Tu et al. | | 290/40 C |
| 7,261,171 B2 * | 8/2007 | de la Torre et al. | | 180/65.31 |
| 7,341,041 B2 * | 3/2008 | Pekau | | 123/206 |
| 7,469,673 B2 * | 12/2008 | Wagner | | 123/241 |
| 7,523,797 B2 * | 4/2009 | Kimura et al. | | 180/65.25 |
| 7,584,813 B2 * | 9/2009 | Yoshida | | 180/65.29 |
| 2005/0008515 A1 * | 1/2005 | Huttlin | | 417/481 |

FOREIGN PATENT DOCUMENTS

| | | | |
|---|---|---|---|
| DE | 3521593 | | 1/1987 |
| FR | 2672340 | | 8/1992 |
| FR | 2691206 | | 11/1993 |
| JP | 55091703 A | * | 7/1980 |
| JP | 56138401 A | * | 10/1981 |

* cited by examiner

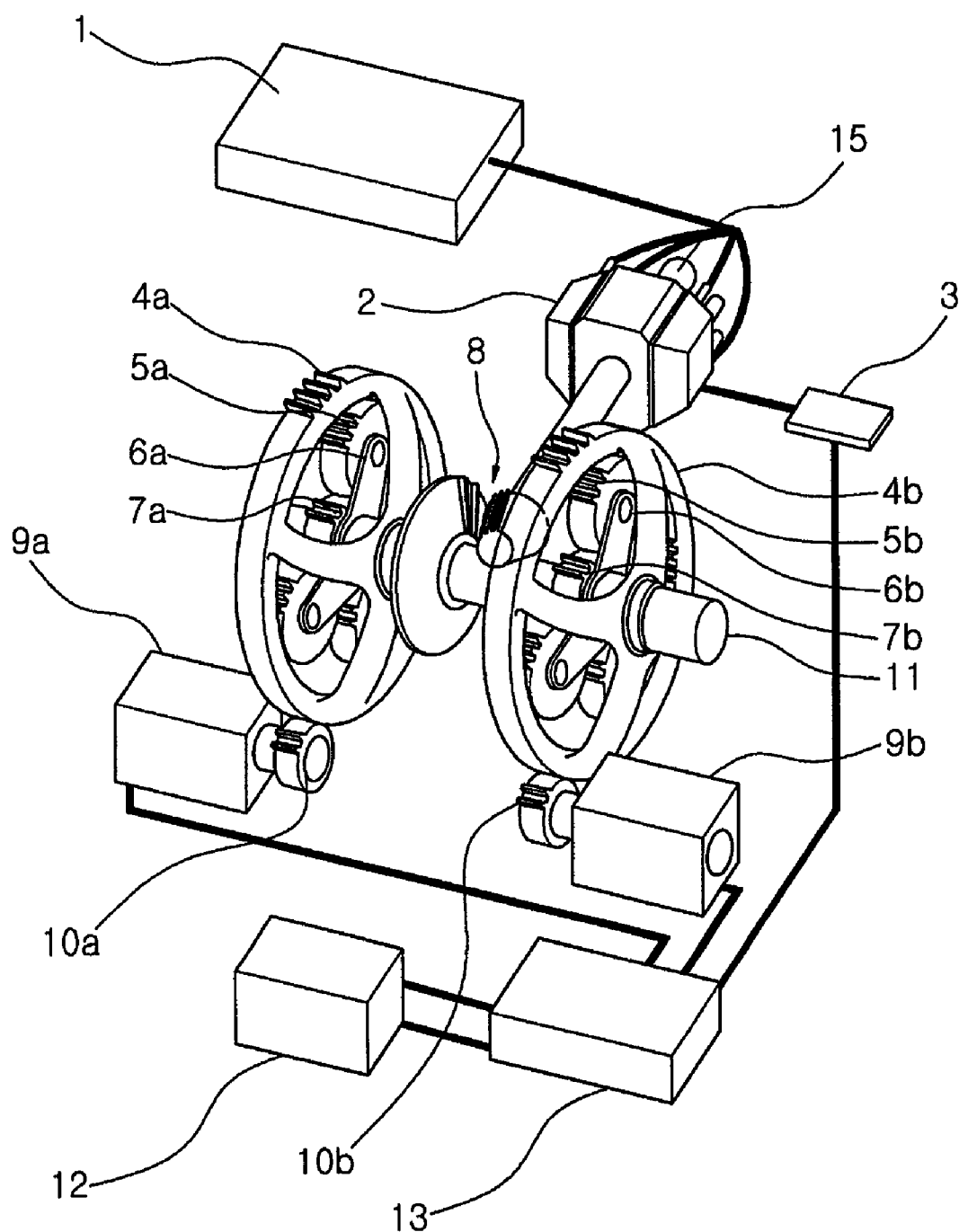
[Figure 1]

【Figure 2】
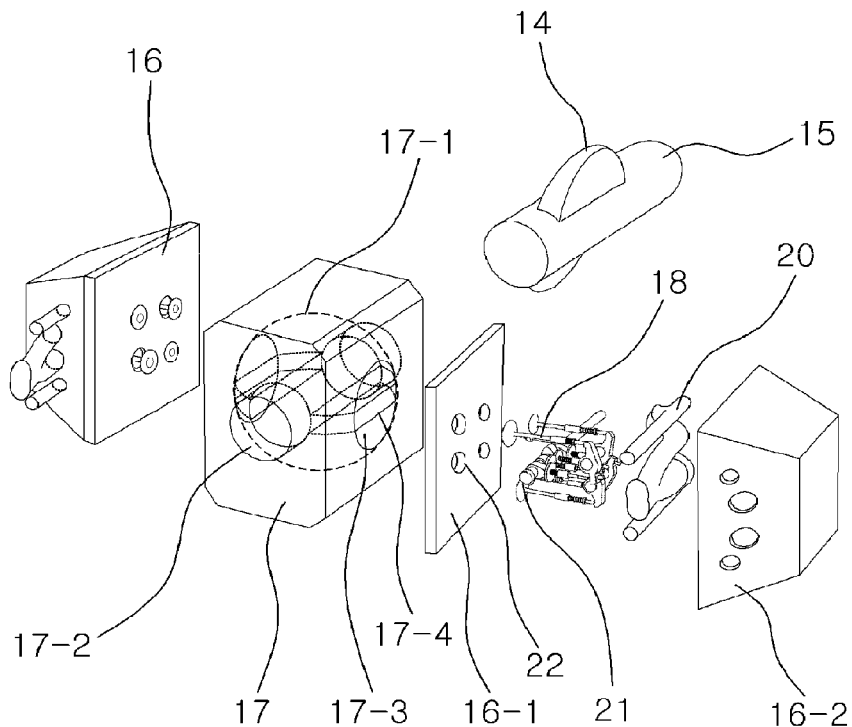
【Figure 3a】
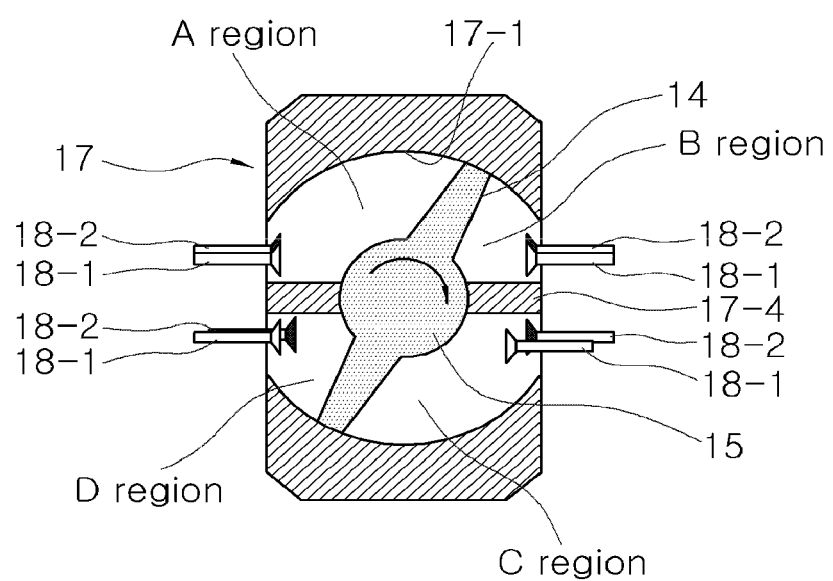

【Figure 3b】
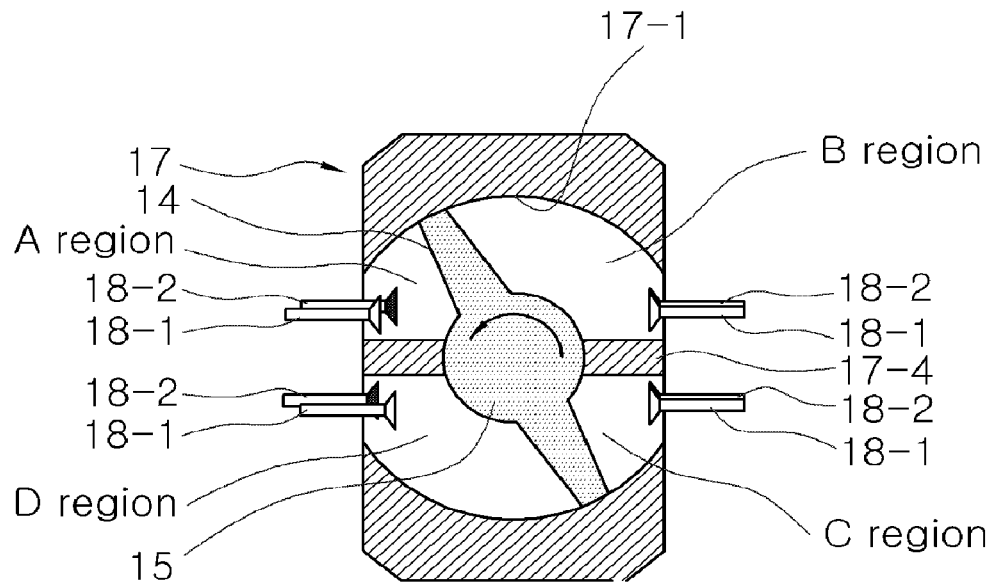
【Figure 3c】
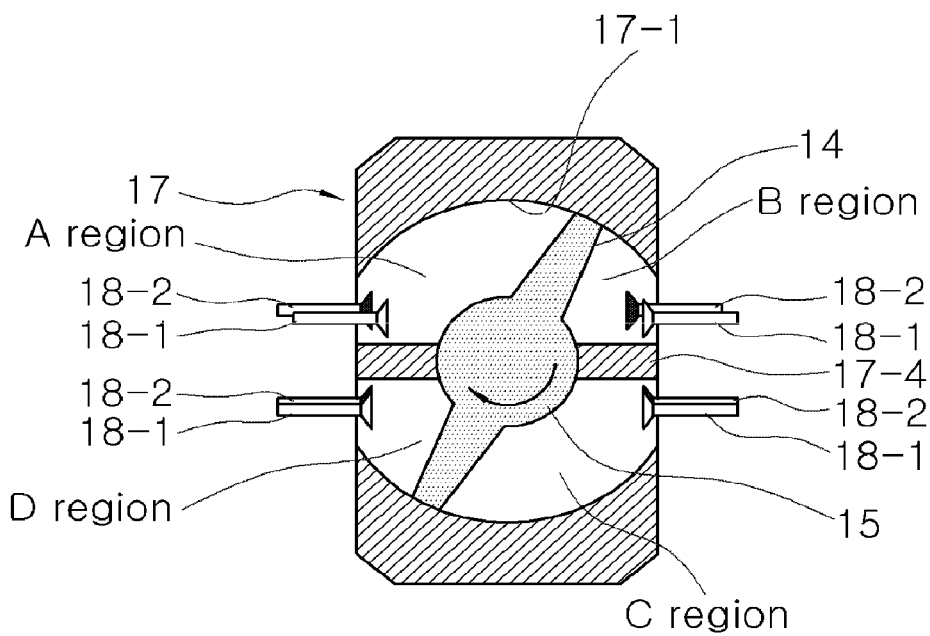

[Figure 3d]
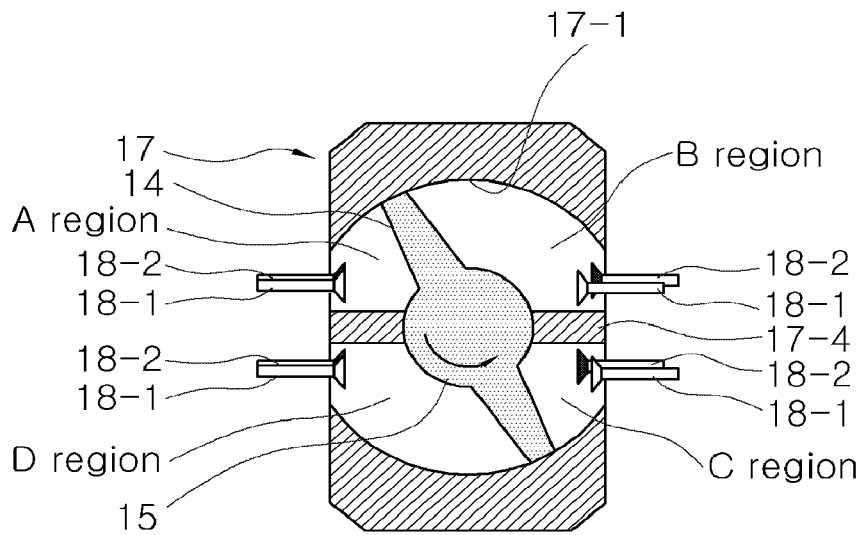
[Figure 4]
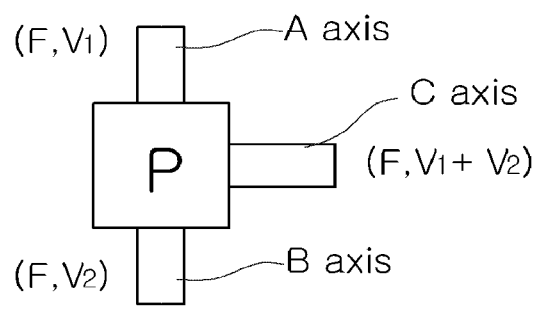
[Figure 5]
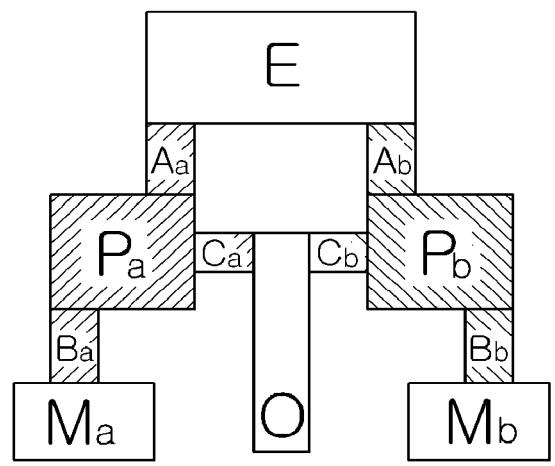

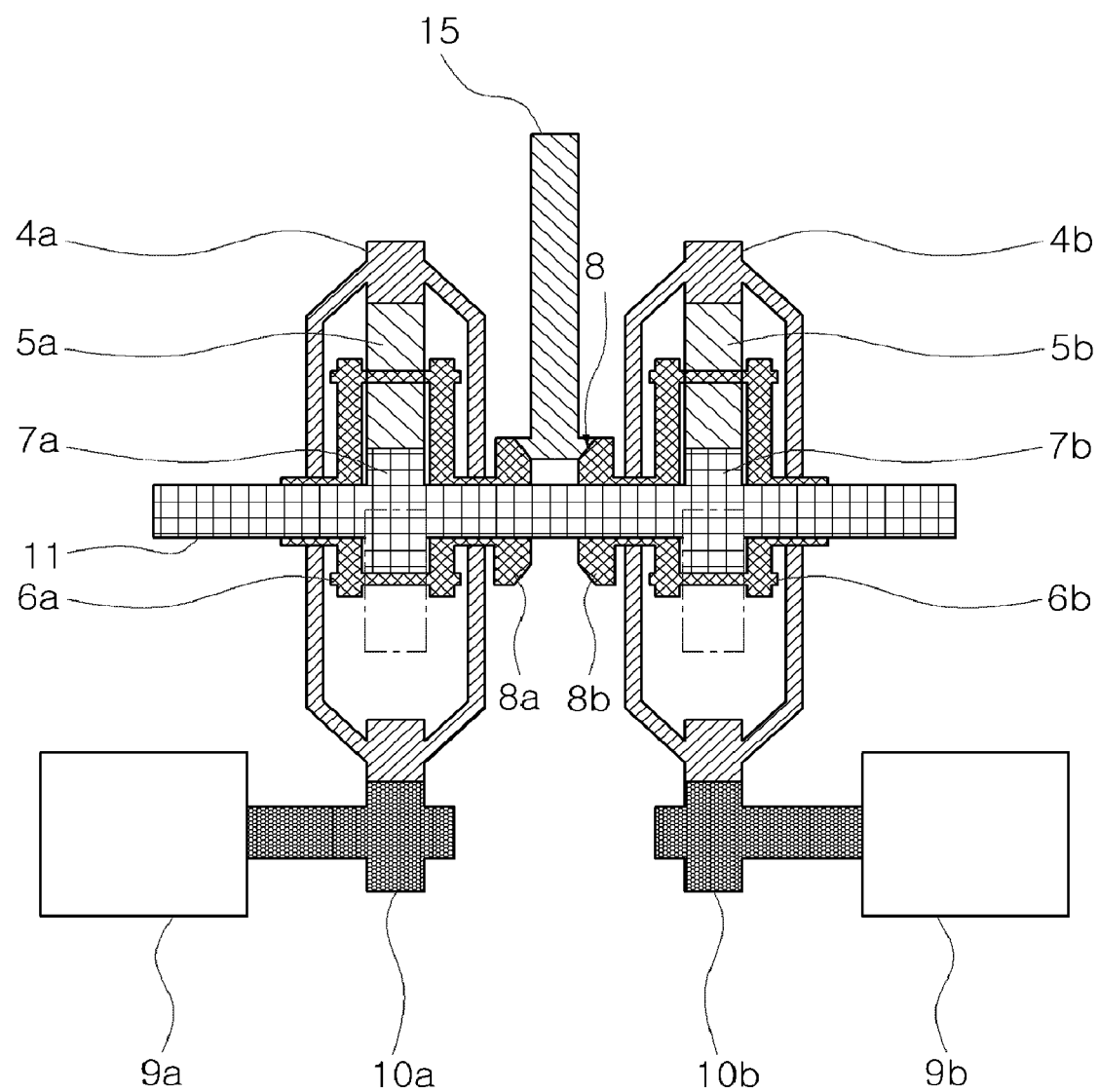
[Figure 6]

[Figure 7]
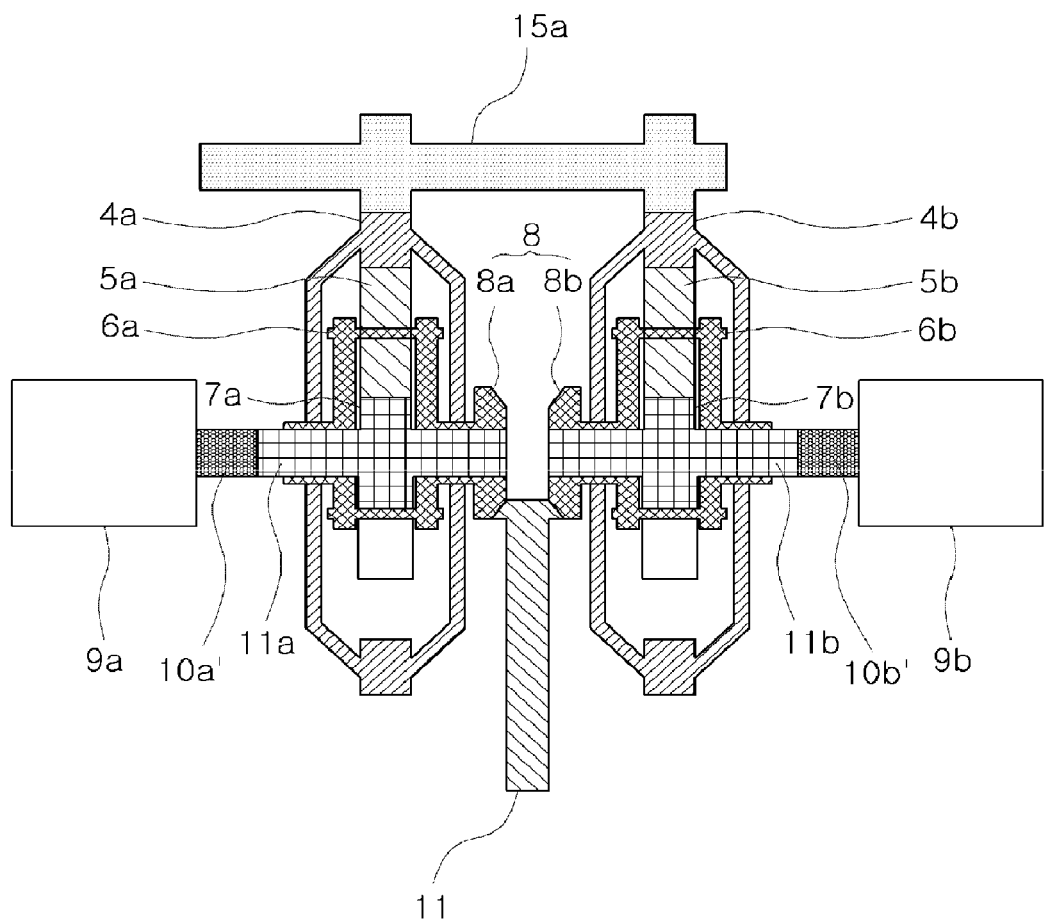
[Figure 8a]
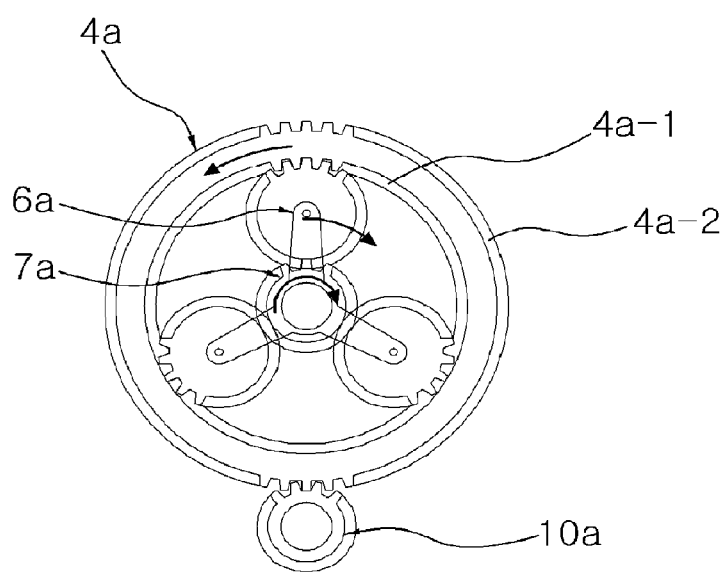

[Figure 8b]
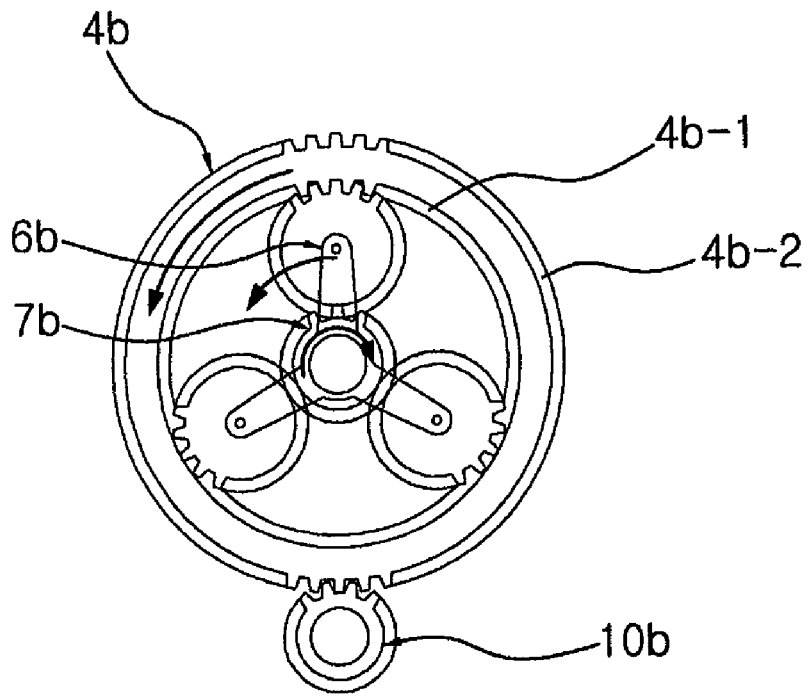
[Figure 9a]
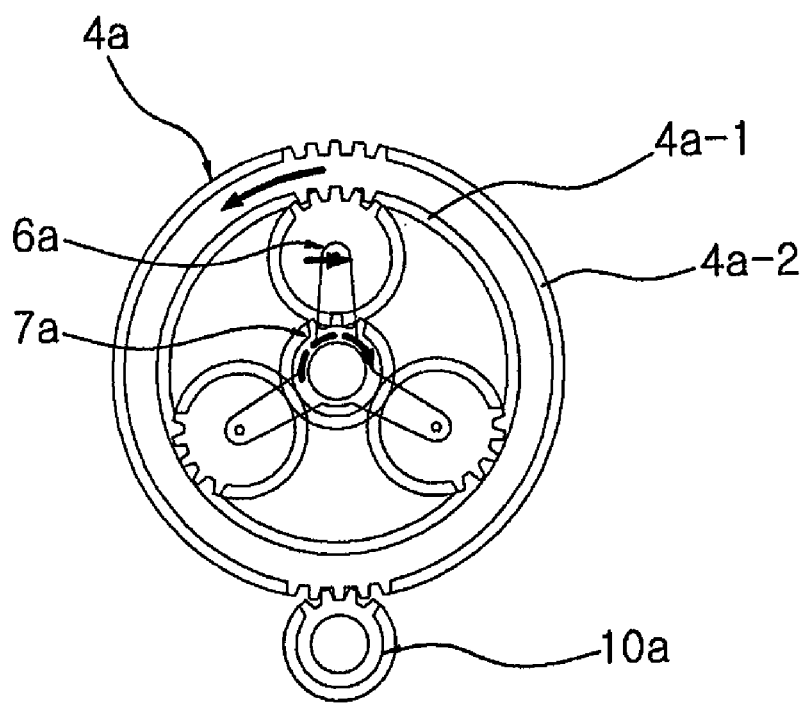

[Figure 9b]
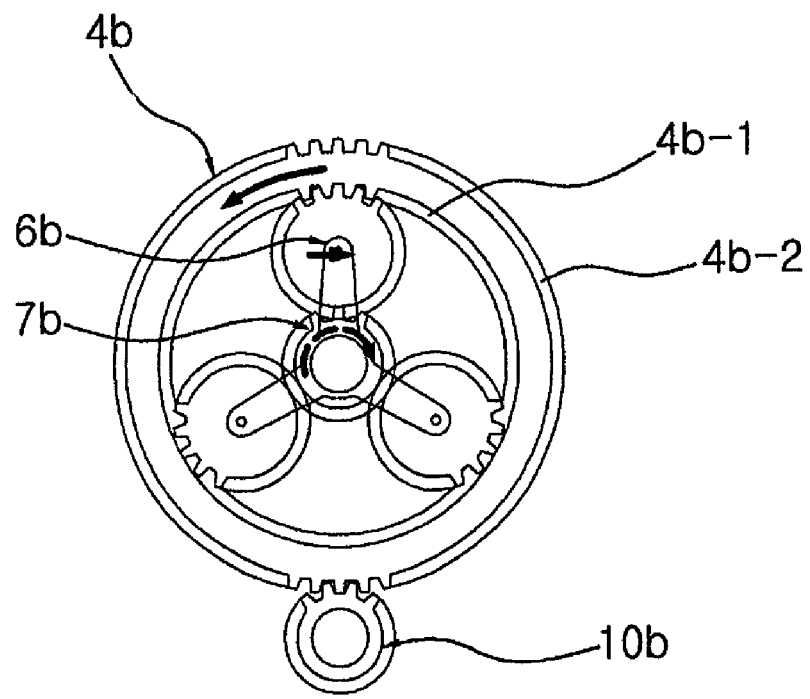
[Figure 10a]
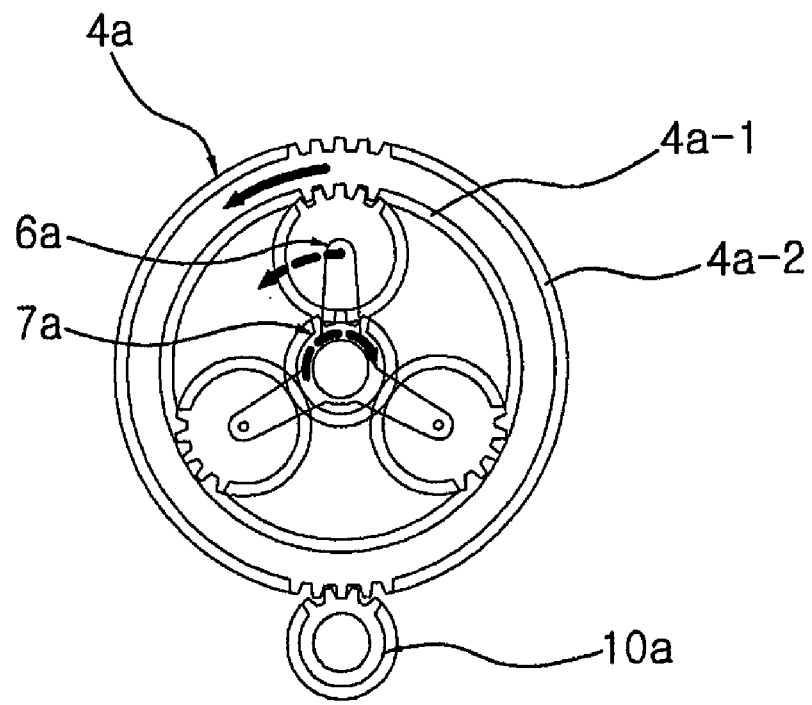

[Figure 10b]
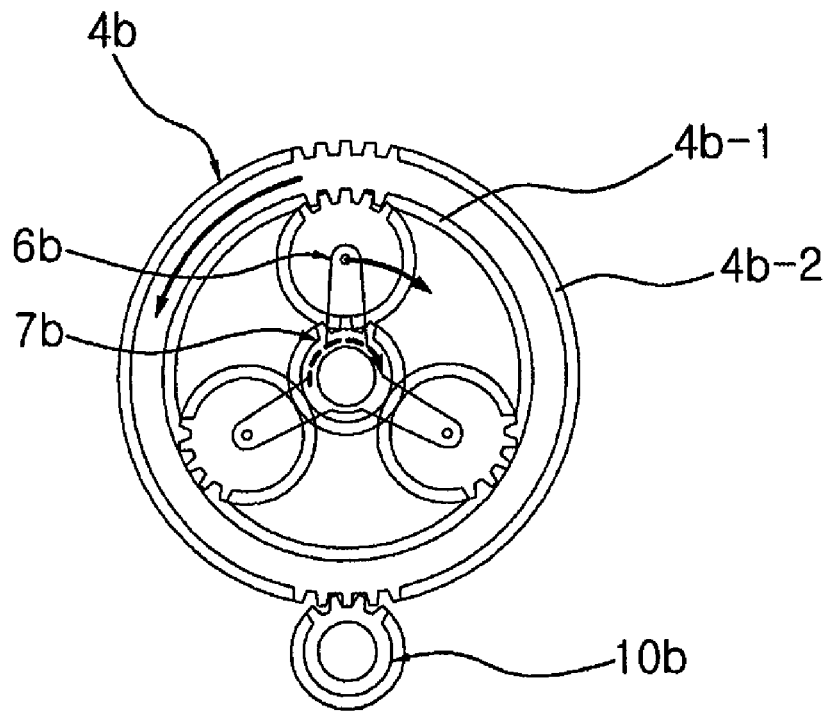
[Figure 11a]
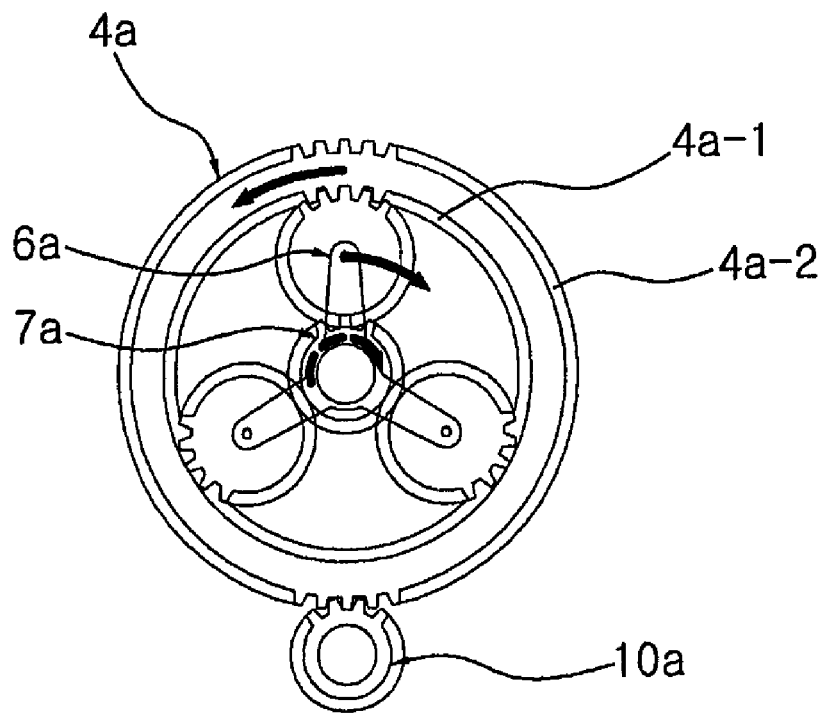

[Figure 11b]
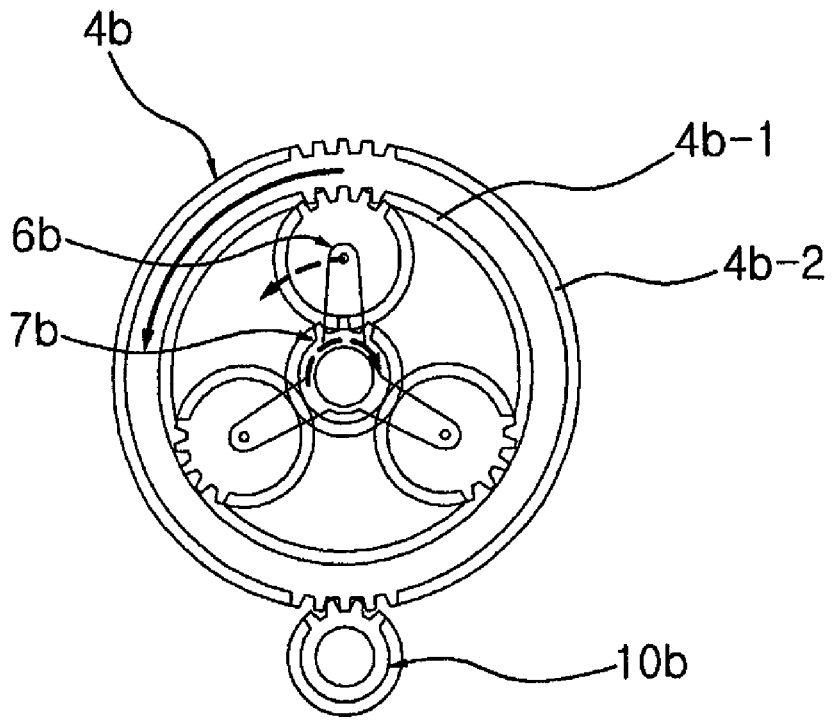
[Figure 12a]
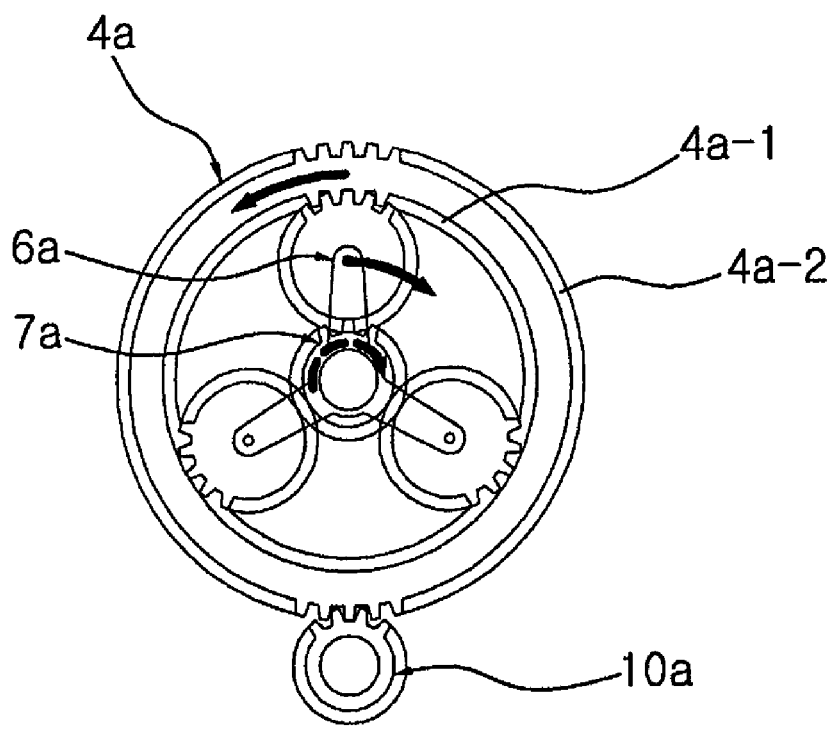

【Figure 12b】
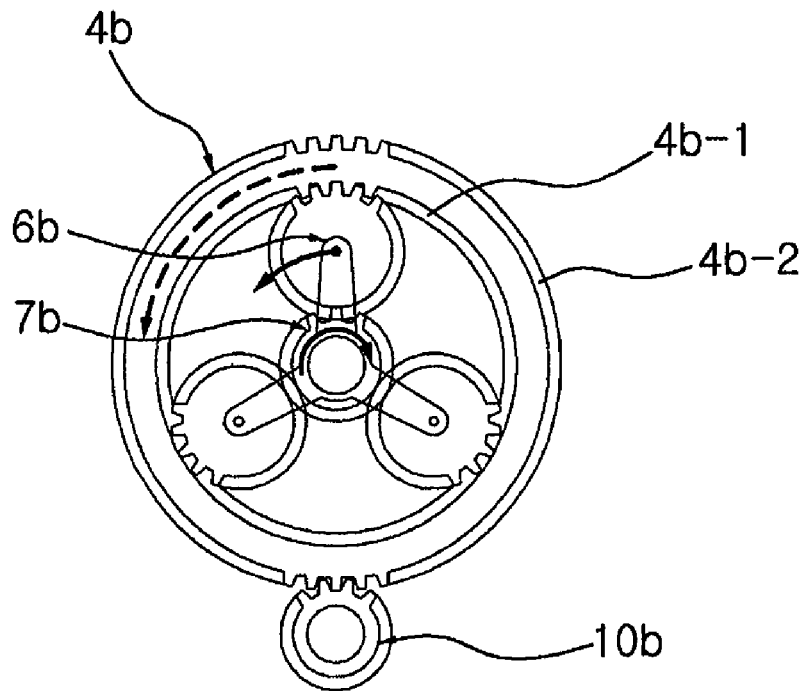
【Figure 13a】
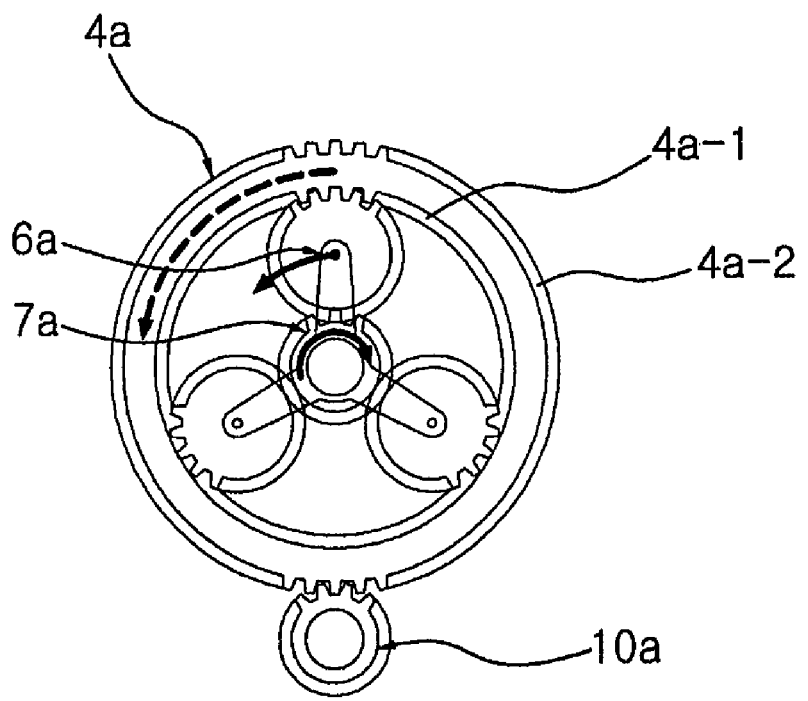

[Figure 13b]
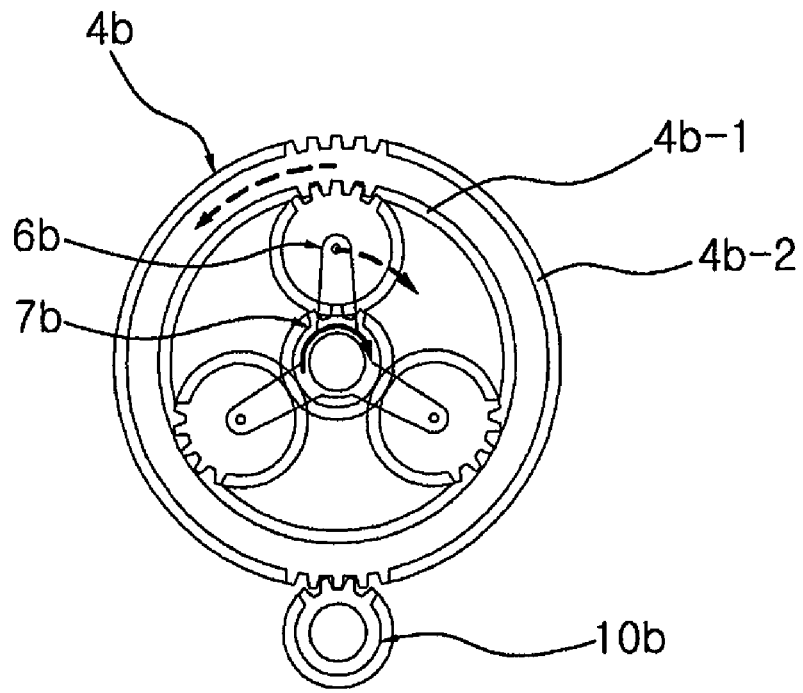
[Figure 14a]
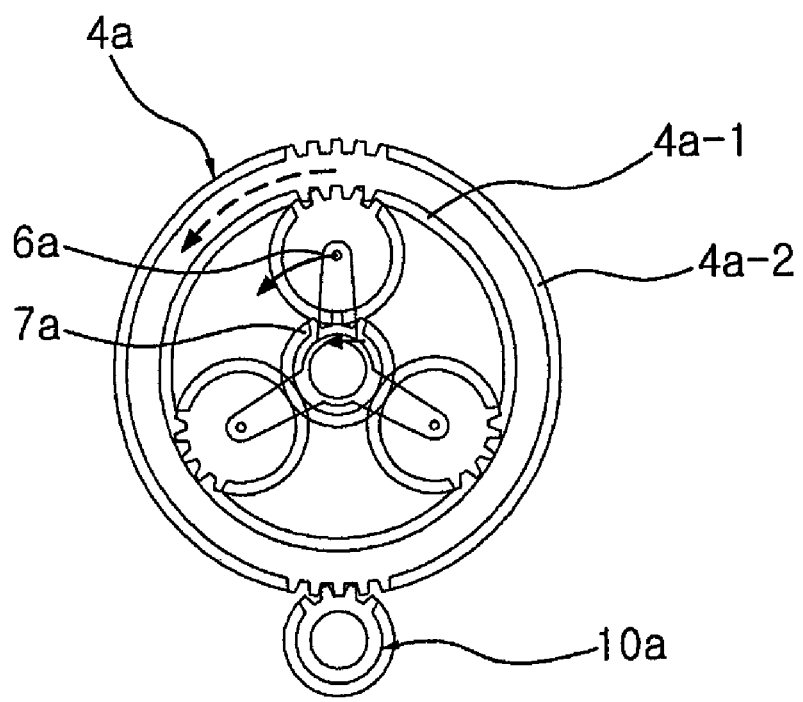

[Figure 14b]
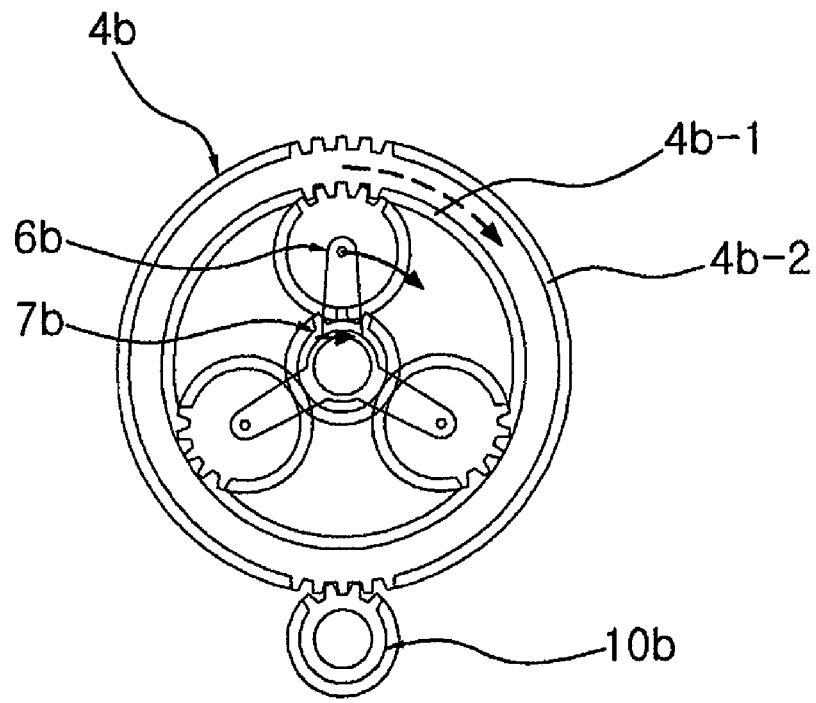
[Figure 15a]
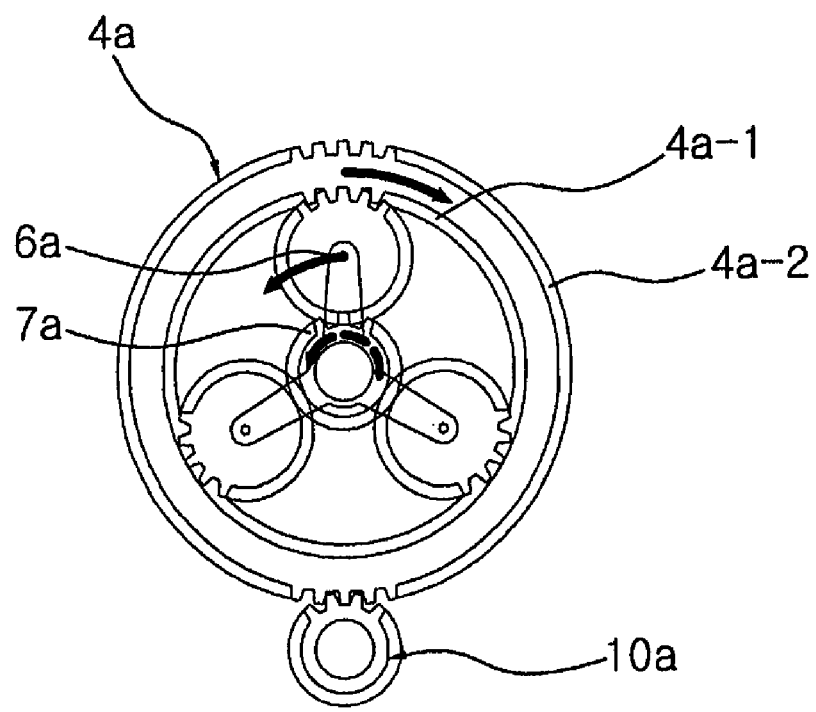

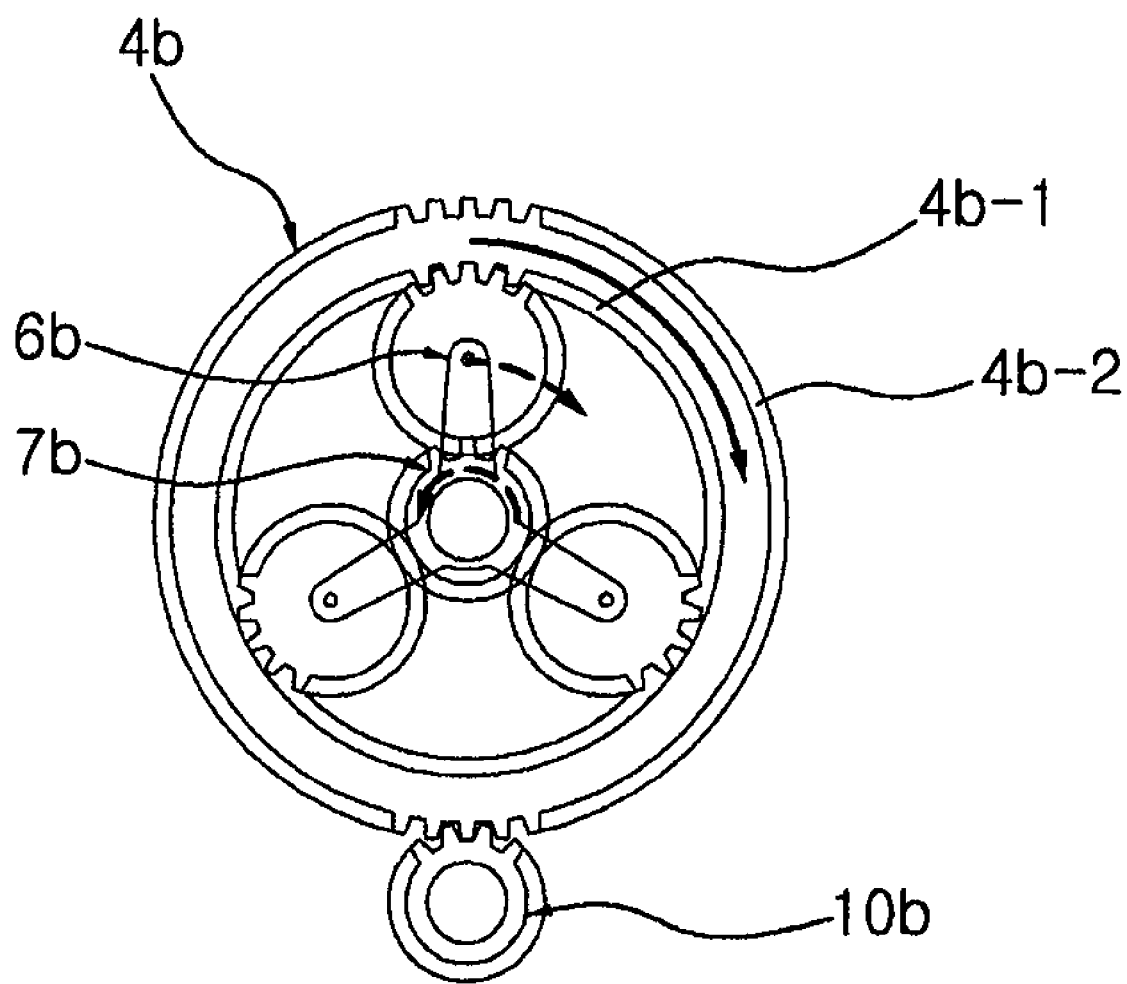
[Figure 15b]

RECIPROCATING ROTATION TYPE ENGINE AND POWER TRANSFERRING DEVICE AND HYBRID SYSTEM USING THE SAME

TECHNICAL FIELD

The present invention relates to a power generation and a power train based on a reciprocating rotary engine and an internal combustion-electric hybrid system. More particularly, the present invention relates to a reciprocating rotary engine generating a reciprocating rotary motion, a power converter converting the reciprocating rotary motion into a unidirectional rotary motion, and a hybrid system utilizing the same.

BACKGROUND ART

A conventional cylinder type engine produces power by converting thermodynamic energy from gas combustion in cylindrical chambers into reciprocating rectilinear kinetic energy. The reciprocating rectilinear motion is converted into a complete rotary motion through a crank unit. In this process, a mechanical power loss arises due to the frictions and vibrations caused by the changes in motion directions.

As a method to overcome the aforementioned problems, rotary engines capable of generating unidirectional motion are utilized. The only rotary engine currently adopted in a production model is the Wankel engine, in which a triangular rotor moves along epitrochoid in housing. In the Wankel engine, each vertex of a triangle plays the role of gas seal in the process of intake, compression, combustion and exhaustion. However, in this case, the increased friction and problematic lubrication between the rotor vertices and cylinder wall may cause rotor vertex abrasion, and consequently the gas sealing function may deteriorate.

Also, due to the abrasion of rotor vertices, the engine itself needs to be redisposed with new one periodically. In order to solve the problems in conventional cylinder type engines, many attempts other than the Wankel engine were made, especially in the form of rotary engine with reciprocating motion.

However, in order to commercialize these rotary type engines, there remain many difficult problems such as designing the structure of combustion chamber and intake/exhaust devices suitable for practical uses in high performance engines and converting the reciprocating rotary motion into a complete rotary motion.

On the other hand, in order to convert the eccentric torque of the Wankel engine or the reciprocating torque of other rotary engines into a complete concentric torque, the direction of force must be changed mechanically. However, a power conversion using only mechanical methods inevitably accompanies frictions and vibrations due to the changes of power directions in power train. Accordingly, a power conversion system utilizing electric motors, which are more reliable in terms of control certainty and effectiveness, may be suggested as a substitute to improve the effectiveness in comparison with existing concepts.

Also, when considering the environmental problems and energy efficiency, the development of an internal combustion-electric hybrid engine is being recognized as an essential task in automobile industry. Currently, several types of hybrid vehicles are in commercial production in Japan, the U.S.A., etc, and they are proven to improve the fuel efficiency. The general principle of a hybrid system is rather simple. Namely, the hybrid system is to increase the fuel efficiency by effectively operating the power from an internal-combustion engine and the power from an electric motor according to the driving conditions. A hybrid car named Prius by Toyota Company is recognized as one of the most successful model among currently commercialized hybrid automobiles, and it uses a system called "power splitter" for interconnection of powers from a cylindrical type engine, an electric motor and a generator, reciprocally converting mechanical energy and electric energy, to thereby utilize the power most effectively.

Although there are some differences between production models, other systems are also based on similar principles. Hybrid systems utilizing a cylinder type engine and an electric motor may differ from each other according to methods of connecting the power generating devices, but they must include an electric motor and a storage battery in addition to an internal-combustion engine. Accordingly, the weight of power train inevitably increases. Methods for solving the aforementioned problems by improving the electric motor design and battery performance, and etc are being studied, but eventually the most effective method is to reduce the weight of the internal-combustion engine, which is the heaviest component. Other than some experimental models, most hybrid cars in production utilize the existing cylinder type engine. Accordingly, the fundamental solutions to the aforementioned problems are not found yet.

DISCLOSURE

Technical Problem

A first objective of the present invention is to provide a 4-stroke internal combustion engine with significantly reduced size and weight.

A second objective of the present invention is to provide an engine without the impact and friction between piston and cylinder wall in conventional cylinder type engines and thereby, reduce the power loss and expand the life of engine.

A third objective of the present invention is to provide a reciprocating rotary engine generating a reciprocating rotary motion which can be more easily converted to a revolutionary motion than the rectilinear motion of conventional cylinder type engines.

A fourth objective of the present invention is to provide a power converter which can more effectively convert the reciprocating rotary motion generated by the reciprocating rotary engine into unidirectional rotary motion.

A fifth objective of the present invention is to provide an effective hybrid system which remedies the problems caused by the characteristic difference between the engine output and the power demand of drive shaft and the structural problems of conventional hybrid system.

Technical Solution

According to an aspect of the present invention, there is provided a reciprocating rotary engine including: an engine block having a torus-shaped chamber inside and a pair of cross walls and having at least one through hole which is concentrically disposed in the center of the torus chamber; an engine shaft provided inside the torus chamber of the engine block and formed in one body with a plurality of pistons on both sides; a sealing plate with a plurality of holes; an intake and exhaust valve device attached to the sealing plate and including a plurality of intake/exhaust valves and camshafts opening/closing the plurality of intake/exhaust valves; an intake and exhaust device inhaling and discharging gas in and out of the torus chamber; and a cover protecting the intake and exhaust valves and the intake and exhaust device.

According to another aspect of the present invention, there is provided a power converter of receiving a reciprocating rotary motion power from a reciprocally rotating engine shaft and converting the same into a unidirectional rotary motion, the power converter including: a plurality of input axes connected to an engine; a plurality of other input axes connected to power combination devices; a plurality of power combination devices each of which has three ends, with the first one being connected to the input axis, the second to the other input axis, and the third to the output axis; and an output axis of the power converter connected to the plurality of output axes of the power combination devices, wherein each electric motor is connected to each of the plurality of the other input axes.

According to still another aspect of the present invention, there is provided a hybrid system comprising a reciprocating rotary engine generating a reciprocating rotary motion; a power converter converting the reciprocating rotary motion into a unidirectional rotary motion; and an engine control device controlling driving of the reciprocating rotary engine, wherein the reciprocating rotary engine comprises an engine block having a torus chamber formed in its inside; an engine shaft concentrically disposed in the center of the torus chamber; a pair of cross walls disposed in the torus chamber to face each other and dividing the torus chamber into two regions; and a pair of pistons symmetrically provided on the outer circumferential surface of the torus chamber and provided in the divided portions of the torus chamber respectively, the torus chamber is divided into four regions by the internally disposed cross walls and the pistons, and in each of the four regions the strokes of intake, compression, expansion and exhaustion are simultaneously generated while the piston oscillates twice and the 4-strokes are performed once while the piston reciprocally rotates twice, the power converter comprises a pair of planet gears including a sun gear, an planet gear carrier, and a ring gear and disposed to face each other on the center of the rotary engine shaft of the reciprocating rotary engine; an electric motor for power generation driving an external gear or utilizing the torque of the external gear as a power; an electric motor control device controlling the electric motor for power generation, the sun gear is integrally combined with the drive shaft passing through the center of the planet gear and driven in an identical direction to a rotation direction of the sun gear, and the electric motor for power generation periodically changes the torque of the ring gear via the external gear in correspondence to the reciprocating torque that is transferred by the engine shaft and provides a corresponding power to the planet gear carrier.

Advantageous Effects

According to the present invention, a hybrid system can have a structure which can be commercialized without a significant change in a manufacturing process. Also, the entire structure of a power system can be notably modified. Accordingly, it is possible to reduce a power loss in a conventional engine and its crank device, and improve energy efficiency.

Also, according to the present invention, a power system in which a weight and size is greatly reduced with greatly reduced weight and size by utilizing a hybrid system without a crank device and a reciprocating rotary engine having a cylindrical sealed chamber can be embodied. Accordingly, the present invention has a better advantage in energy efficiency than the conventional hybrid system.

Also, according to the present invention, it is possible to have a symmetrical appearance, unlike a conventional power generation and power train in an elongated form. Accordingly, it is possible to facilitate the security of an automobile and the design of an engine chamber.

Also, according to the present invention, an electrical device is additionally utilized so as to solve a fundamental problem in the conventional mechanical method in a power train process. Accordingly, frictions and vibrations occurred when changing a power may be reduced. Also, it is possible to improve thermodynamic efficiency by utilizing a power converter corresponding to an output characteristic of a reciprocating rotary engine.

Also, according to the present invention, it is possible to reduce weight and size of the power system. Accordingly, a small-sized 4-stroke which is utilized for a motorbike, a cultivator, etc. can be embodied. Therefore, its efficiency can be increased along with low noise and low vibration.

Also, according to the present invention, while a reciprocating rotary motion of a reciprocating rotary engine does not have directivity, an electric motor can easily change direction. Accordingly, it is possible to forward and backward an automobile using a hybrid system according to the present invention. Such a power characteristic may be advantageously applicable to a large military vehicle or construction equipment needing a backward movement.

DESCRIPTION OF DRAWINGS

FIG. 1 is a perspective view illustrating a schematic configuration of an embodiment utilizing a planetary gear system according to a hybrid system of the present invention;

FIG. 2 is an exploded perspective view illustrating a configuration of a reciprocating rotary engine;

FIGS. 3a through 3d are cross-sectional views illustrating an operational structure of a reciprocating rotary engine;

FIG. 4 is a view illustrating a power combination device according to the present invention;

FIG. 5 is a schematic view illustrating a structure of a power converter including two power combination devices and two electric motors;

FIG. 6 is a cross-sectional view illustrating a power converter according to an embodiment of the present invention;

FIG. 7 is a cross-sectional view illustrating a power converter according to another embodiment of the present invention;

FIGS. 8a and 8b are views illustrating an embodiment of an operation of the power converter;

FIGS. 9a and 9b are views illustrating a state of starting with only an output of an electric motor for power generation in a state where the reciprocating rotary engine is stopped;

FIGS. 10a and 10b are views illustrating a state of starting the reciprocating rotary engine;

FIGS. 11a and 11b are views illustrating an acceleration state by an operation of the reciprocating rotary engine;

FIGS. 12a and 12b are views illustrating a constant speed driving state;

FIGS. 13a and 13b are views illustrating a deceleration state;

FIGS. 14a and 14b are views illustrating an idle state; and

FIGS. 15a and 15b are views illustrating an astern state.

BEST MODE

A reciprocating rotary engine according to the present invention includes: an engine block having a torus chamber formed in its inside and having a through hole which is concentrically disposed in a center of the torus chamber; an engine shaft passing through the through hole to be concentrically disposed in the center of the torus chamber; a pair of cross walls disposed in the torus chamber along the through hole to face each other and dividing the torus chamber into two regions; a pair of pistons symmetrically provided on an outer circumferential surface of the engine shaft to be integrated with the engine shaft, having an identical outer appearance to a cross-section of the torus chamber and provided in the divided portions of the torus chamber respectively; and a valve for intake/exhaust in the torus chamber. In this instance, the torus chamber is divided into four regions by the internally disposed cross walls and pistons. While the pistons rotate once, intake, compression, expansion and exhaustion occur at the same time in each corresponding region.

A power converter receiving a reciprocating rotary motion from an engine shaft in a reciprocating rotary motion, and converting the power into a unidirectional rotary motion according to the present invention includes a pair of power combination devices and a pair of electric motors for motor-power generation. In this instance, each of the pair of power combination devices includes: a rotation axis A receiving a reciprocating rotary power from the each engine shaft; a rotation axis B connected to the electric motor for motor-power generation; and a rotation axis C simultaneously transferring power to each drive shaft. When a power is transmitted from an outside to the A axis and from three rotation axes to B axis, the power combination device transfers the power which is combined through the C axis, to an outside. In this instance, the A axis and the B axis may rotate at different speeds although a force corresponding to each other is applied. An electric motor connected to the B axis of the power combination device operates as a motor when transferring a torque to the B axis. Also, when receiving a torque from the B axis, the electric motor operates as a generator and provides a corresponding power to a reciprocating torque of the engine shaft which is transferred via the A axis.

An example of mechanical devices according to the principles of the power combination device includes a planet gear or a differential gear. In the planet gear, a planet gear carrier, a ring gear and a sun gear construct three rotation axes. In the differential gear, two side gears and a pinion carrier construct three rotation axes. In the case of the planet gear or the differential gear, even when changing roles of three rotations axes, the planet gear or the differential gear functions in an identical principle. Accordingly, the roles of three rotation axes A, B and C may be determined according to a design demand.

MODE FOR INVENTION

Hereinafter, a configuration and operation of a hybrid system according to the present invention will be described with reference to the accompanying drawings. In the present embodiment, an planet gear is utilized as a power combination device and an planet gear carrier corresponds to an A axis, a ring gear to a B axis and a sun gear to a C axis. Also, a puppet valve which is widely used in a 4-stroke internal combustion engine is utilized for intake and exhaustion in a torque chamber.

FIG. 1 is a perspective view illustrating a schematic configuration of a hybrid system according to the present embodiment, FIG. 2 is an exploded perspective view illustrating a configuration of a reciprocating rotary engine, and FIGS. 3a through 3d are cross-sectional views illustrating an operational structure of a reciprocating rotary engine.

As shown in FIG. 1, the hybrid system according to the present invention includes a reciprocating rotary engine 2 generating a reciprocating rotary power, a power converter converting the reciprocating rotary power from the reciprocating rotary engine 2 through a uni-directional rotary motion, a fuel tank 1 supplying fuel to the reciprocating rotary engine 2, and an engine control device 3 controlling drive of the reciprocating rotary engine 2.

As shown in FIG. 2, the reciprocating rotary engine 2 includes an engine block 17 having a torus chamber 17-1 inside; an engine shaft 15 provided coaxially with a center of the torus chamber 17-1 and having a piston 14 which is in an identical shape to a cross-section of the torus chamber 17-1; an intake and exhaust valve device 21 provided form an outside of the engine block 17 to an inside of the torus chamber 17-1 and selectively opening/closing the inside of the torus chamber 17-1; an intake and exhaust device intaking and exhausting gas to an inside and an outside of the torus chamber 17-1 according to operation of the intake and exhaust valve device 21; and a head portion disposed with the intake and exhaust valve 21 and the intake and exhaust device 20 which are provided on an outside of the engine block 17.

The engine block 17 is formed with a first through hole 17-2 which is concentrically disposed with the center of the torus chamber 17-1 and a second through hole 17-3 which is orthogonally provided to the first through hole 17-2. A pair of cross walls 17-4 are provided to face each other on the second through hole 17-3 and divide the torus chamber 17-1 into two portions. The engine shaft 15 having the piston 14 is rotatably inserted into the first through hole 17-2 and supported by the pair of cross walls 17-4. In this instance, the piston 14 forms two divisions divided by the pair of cross walls 17-4.

Also, a sealing plate 16-1 is provided on both sides of the second through hole 17-3 to seal the second through hole 17-3. A plurality of holes 23 are formed on the sealing plate 16-1 to correspond to each division divided by the pair of cross walls 17-4. In this instance, the intake and exhaust valve device 21 includes a plurality of intake/exhaust valves 18 and a plurality of camshafts to open/close the plurality of intake/exhaust valves 18. Each of the plurality of intake/exhaust valves 18 is provided in each hole 22 formed on the sealing plate 16-1, to open/close the each hole 22 according to operation of the camshaft.

The intake/exhaust device 20 is provided in a rear portion of the intake and exhaust valve device 21 which is mounted onto the sealing plate 16-1, so that exhaust gas generated from an inside of each cylinder may be discharged to an outside or a new air may be inhaled into the inside of each cylinder via the holes 22. In this instance, the intake and exhaust valve device 21 and the intake and exhaust device 20 mounted to the sealing plate 16-1 are protected by a cover 16-2 in which a plurality of holes are formed to correspond to the intake and exhaust device 20. However, the configuration of the head portion described above is not limited to the present embodiment and various modifications may be applied.

A longitudinal section of the piston 14 may be embodied in various type of shapes, such as a semicircle, a square, an oval, etc. In this instance, the shape of the torus chamber 17-1 may have various types of surfaces corresponding to the piston 14.

Hereinafter, an operational structure of the reciprocating rotary engine 2 constructed above will be described with reference FIG. 2 and FIGS. 3a to 3d.

As shown in FIGS. 2 and 3, the torus chamber 17-1 formed in the engine block 17 is divided into four regions A, B, C and D by the cross wall 17-4 and the piston 14 which is provided in the engine shaft 15.

FIG. 3a illustrates a moment that a mixed gas of fuel and air is exposed by an ignition source (not shown) and thereby causes an expansion stroke in the region A. In this state, as the engine shaft 15 rotates clockwise according to the given arrow, a compression stroke that the inhaled mixed gas is compressed progresses in the region B, an intake stroke that the intake valve 18-1 is open and air is inhaled from an outside progresses in the region C, and an exhaust stroke that the exhaust valve 18-1 is open and exhaust gas is discharged progresses in the region D, at the same time.

FIG. 3b illustrates a moment that an expansion stroke occurs by explosion of the mixed gas in the region B where the compression stroke is in progress in FIG. 3a. In this case, the engine shaft 15 rotates counterclockwise. Accordingly, the compression stroke progresses in the region C, the intake stroke in the region D, and the exhaust stroke in the region A. Referring to FIG. 3c, according to the method described above, as the engine shaft 15 rotates clockwise by the expansion stroke in the region C, the intake stroke occurs in the region A, the exhaust stroke in the region B, and the compression stroke in the region D, at the same time. Also, referring to FIG. 3d, the expansion stroke occurs in the region D, the compression stroke in the region A, the intake stroke in the region B, and the exhaust stroke in the region C.

As described above, each region divided by the cross wall 17-4 and the piston 14 of the engine shaft 15 operates as a cylinder. Also, as the expansion stroke occurs in order of the regions A, B, C and D in order, the engine shaft 15 also reciprocally rotates clockwise and counterclockwise. Through this, a reciprocating torque is obtained in the reciprocating rotary engine 2 of the present invention.

The reciprocating rotary engine 2 according to the present invention described above may be constructed as a 2-cycle engine, in addition to the aforementioned 4-stroke.

FIG. 4 illustrates a structure of a power combination device which is utilized for a power converter converting the reciprocating torque generated in the reciprocating rotary engine 2 into a uni-directional rotation.

As shown in FIG. 4, a power is inputted from two axes A and B, combined in lines via a power combination device P and outputted via an axis C. In this instance, a torque corresponding to each other acts on the two axes A and B. A torque of an output axis is determined, and the rotation speed of the output axis is the addition of rotation speeds of the two input axes. This indicates a conceptual mechanical relation. In an actual mechanical device, the relation between the torque and the rotation speed may be different under a limitation condition where energy is maintained, according to the structure of the mechanical device. In the case of an planet gear or a differential gear, a torque and a rotation speed are determined according to the role and size of each of element gears.

FIG. 5 is a schematic view illustrating a structure of a power converter including two power combination devices and two electric motors. Input axes Aa and Ab of the power combination devices Pa and Pb are simultaneously connected to an engine E. Other input axes Ba and Bb are connected to two electric motors Ma and Mb, respectively. Also, two output axes Ca and Cb are simultaneously connected to an output axis 0 of the power converter. In this instance, the output axis 0 is a drive shaft driving a wheel.

FIGS. 6 and 7 are cross-sectional views illustrating a configuration of a power converter using an planet gear.

Referring to FIG. 6, in the power converter, planet gear carriers 6a and 6b of the planet gear operate as the axis A, ring gears 4a and 4b as the axis B, and the sun gears 7a and 7b as the axis C.

The power converter of FIG. 7 is another embodiment of the power converter of FIG. 6. In FIG. 7, ring gears 4a and 4b of the planet gear operate as the axis A, sun gears 7a and 7b as the axis B and planet gear as the axis C. In this case, the engine shaft 15 is directly connected to the ring gears 4a and 4b, the sun gears 7a and 7b connected to the motor drive shafts 10a' and 10b', and the planet gear carriers 6a and 6b are respectively connected to the drive shafts 11a and 11b. In this instance, the drive shaft 11 is a drive shaft for driving a wheel.

In addition, the role of each gear may be determined by other combinations. A configuration of a power converter using not the planet gear but a differential gear may be constructed in various shapes. Also, each gear operates by a basically identical mechanical principle. A particular shape may be selected according to an actual demand.

As described above, the power converter may be constructed in various shapes but operates by an identical mechanical principle. Accordingly, an operation of the power converter and an operation of a hybrid system using the power converter will be described via an embodiment using the planet gear shown in FIGS. 1 and 6.

The power converter using the planet gear includes a pair of planet gears PG which are provided with the sun gears 7a and 7b, planet gear carriers 6a and 6b, and the ring gears 4a and 4b; external gears 10a and 10b combined with the ring gears 4a and 4b; a motor/generator (M/G) dual role electric motor for power generation 9a and 9b, working as a motor when it rotate the external gears 10a and 10b to drive the ring gears 4a and 4b, and working as a generator when the external gears 10a and 10b are driven by the ring gears 4a and 4b; an electric motor control device 13 controlling the electric motors for power generation 9a and 9b; and a storage battery 12 supplying a power to the electric motors for power generation 9a and 9b or charging a power which is generated from the electric motors for power generation 9a and 9b.

The planet gear carriers 6a and 6b have the engine shaft 15 on its one end and receive a reciprocating torque according to a reciprocation rotary motion of the rotation axis 1 and also include a plurality of planet gears 5a and 5b which are rotatably provided. The sun gears 7a and 7b are disposed in the center of the planet gear carriers 6a and 6b and combined with the plurality of planet gears 5a and 5b. Also, internal circumferential gear portions 4a-1 and 4b-1 and external circumferential gear portions 4a-2 and 4b-2 are provided on the internal circumferential surface and the external circumferential surface of the ring gears 4a and 4b (see FIGS. 8a and 8b). A plurality of planet gears 5a and 5b mounted on the planet gear carriers are simultaneously combined with the internal gear portions 4a-1 and 4b-1. Also, the external gears 10a and 10b are combined with the external circumferential gear portions 4a-2 and 4b-2.

The sun gears 7a and 7b are integrated with the drive shaft 11 which passes through the center of the planet gear, so that the drive shaft 11 rotates according to rotation of the sun gears 7a and 7b. Namely, the coaxially positioned sun gears 7a and 7b function to transfer a power from the engine 2 and the electric motors 9a and 9b to the drive shaft 11. In this instance, the planet gear carriers 6a and 6b and the ring gears 4a and 4b are designed to have larger rotational inertia than mass and thus, operate as a flywheel.

In the present embodiment, to smoothly transfer the reciprocating torque which is generated from the reciprocating rotary engine 2 to the power converter, a bevel gear 8 is formed on an end portion of the protruded engine shaft 15 and bevel gears 8a and 8b are combined in end portions of the planet gear carriers 6a and 6b. However, a power transfer method between the engine shaft 15 and the planet gear carriers 6a and 6b may adopt any type of power transfer method, such as other gearing methods, a chain interoperation method, etc, in addition to the bevel gear.

Hereinafter, an operation of the power converter will be described with reference to FIGS. 8a and 8b.

FIGS. 8a and 8b illustrate the operation of the power converter. Each view illustrates each of left/right side planet gears seen from a right side of FIG. 6.

Initially, a direction and a length of each arrow indicate a rotation direction and rotation speed respectively. The clockwise rotation of the sun gears 7a and 7b combined with the drive shaft 11 indicates an advance direction.

In the planet gear PG, the rotation speeds of two elements of the sun gears, the planet gear carriers and the ring gears determine the rotation speed of a remaining element. When the engine shaft 15 rotates counterclockwise by the engine 2, the left and right planet gears facing each other and combined with other on the center of the engine shaft 15 rotate as shown in FIGS. 8a and 8b, respectively.

In the case of the left planet gear PG of FIG. 8a, as the planet gear 6a rotates clockwise, the planet gear 5a rotates counterclockwise according to the internal circumferential gear portion 4a-1 and thereby, moves. In this case, to transfer a torque of the planet gear carrier 6a to the drive shaft 11 via the sun gear 7a, a corresponding power must work on the ring gear 4a in an opposite direction to the torque direction of the planet gear carrier 6a. Accordingly, the corresponding power of the ring gear 4a is generated by driving the external gear 10a combined with the external gear portion 4a-2 of the ring gear 4a to rotate the ring gear 4a counterclockwise. Accordingly, the sun gear 7a receives a driving power in a clockwise direction which is an advance direction.

In the meantime, in the case of the left planetary gear PG of FIG. 8b, as the planet gear 6b rotates counterclockwise by the rotation axis 15, the planet gear 5b of the planet gear carrier 6b transfers a torque to the sun gear 7b in an astern direction. In this case, a torque for an advance direction is transferred to the sun gear 7a by quickly rotating the ring gear 4a in an identical direction to a rotation direction of the planet gear carrier 6b. Accordingly, both left and right planet gears receive a torque for an advance direction.

As described above, since the engine shaft 15 reciprocally performs a rotary motion, the driving state of the left and right planet gears repeats states shown in FIGS. 9a and 9b. Accordingly, the corresponding power of the ring gears 4a and 4b is synchronized to a reciprocating rotary period of the engine shaft 15 and provided to the ring gears 4a and 4b. Through this, a power may be transferred in a certain direction. In this instance, a difference of the corresponding power provided by the electric motors for power generation 9a and 9b is in proportion to the torque of the engine. Also, the rotation direction of the drive shaft 11 is determined by the rotation direction of the electric motor.

Also, in FIGS. 5a and 5b, when the left and right planet gears are simultaneously operating, each of the ring gears 4a and 4b has a difference in rotation speed. Such difference determines a difference in rotation speed between the two electric motors. The corresponding power with respect to the reciprocating torque of the engine is provided by applying the difference in torque according to the rotation speed of the two electric motors using the electric motor control device 13, when the two electric motors are synchronized by reciprocal rotary motion and rotate having the difference in rotation speed.

FIGS. 9a and 9b through FIGS. 15a and 15b illustrate a state of starting with only an output of the electric motors for power generation 9a and 9b in a state where the reciprocating rotary engine 2 is stopped.

As shown in FIGS. 9a and 9b, when a driving power is provided to the ring gears 4a and 4b in a counterclockwise direction alike to drive the sun gears 7a and 7b to an advance direction, the planet gears 5a and 5b combined with the internal circumferential gear portion 4a-1 of the ring gears 4a and 4b are also driven counterclockwise which drive the sun gears towards an advance direction. In this instance, clockwise torque is generated in the planet gear carriers 6a and 7b, but the torque decreases by combination with the engine shaft 15 and vanishes. Accordingly, an addition of outputs of the electric motors 9a and 9b works on the drive shaft 11, as a driving power, via the sun gears 7a and 7b. In this instance, dotted arrows on the sun gears 7a and 7b indicate that load got the drive shaft 11 in the advance direction.

FIGS. 10a and 10b are views illustrating a state of starting the reciprocating rotary engine.

As described above, when getting to a certain speed after starting using the power of the electric motors 9a and 9b, an engine needs to be started, and the electric motor control device 13 applies the difference to the torque of the electric motors 9a and 9b periodically (see FIG. 1). Such difference in torque, with an inertia force of a vehicle, forms a torque corresponding to the difference between a thick dotted line and a thin solid line which are indicated in the planet carriers 6a and 7b, and induces a rotary motion of the engine shaft 15, and obtains power to start the engine.

FIGS. 11a and 11b are views illustrating an acceleration state by an operation of the reciprocating rotary engine 2.

The acceleration state may obtain a maximum output in such a manner that an output of the engine 2 and an output of the electric motors 9a and 9b, which have the difference in torque, are added and applied to the drive shaft 11. FIG. 11 illustrates that the an addition of torque of the electric motor 9a via the ring gear 4a and the torque of the planet gear carrier 6a is transferred to the drive shaft 11 via the sun gear 7a. FIG. 11 illustrates that the torque of the electric motor 9b operates as the driving power of the planet gear carrier 6b and the sun gear 7b. Namely, the difference between a thick solid line arrow and a thin dotted line arrow which are indicated in two carriers 6a and 6b indicates the torque of engine. An addition of dotted line arrows indicated in the two sun gears 7a and 7b becomes a total driving power which is transmitted to the drive shaft 11.

FIGS. 12a and 12b are views illustrating a constant speed driving state.

In the case of constant speed driving, the electric motor 9a whose rotation speed is slower between the electric motors 9a and 9b is controlled to operate as a motor and generates a torque. The electric motor 9b whose rotation speed is faster between the electric motors 9a and 9b is controlled to operate as a generator and acts as generation loads. In this instance, the power obtained from the generator is utilized for driving the electric motor 9a. As necessary, a portion of an engine power may be utilized for charging the storage battery 12 by decreasing a rotational output of the electric motor 9a and increasing generation loads.

FIGS. 13a and 13b are views illustrating a deceleration state.

In the case of deceleration, the electric motor control device 13 controls both the electric motors 9a and 8b to operate as a generator. In this instance, the inertia of a vehicle is utilized as a power for regeneration through the electric motors 9a and 9b by decreasing an output of the engine.

In the case of the idle state, in a state where the sun gears 7a and 7b are stopped by a brake, the electric motor control device 13 controls both the electric motors 9a and 9b to operate as a generator. In this instance, the power of the engine 2 is utilized for generation through reciprocating rotary motion of the ring gears 4a and 4b. In this instance, an offset force acts on the sun gears 7a and 7b to remove the torque. After this, an advance or astern becomes possible.

FIGS. 15a and 15b are views illustrating an astern state.

When driving the electric motors 9a and 9b into an opposite direction to an advance direction in the idle state (see FIGS. 14a and 14b), going astern is also possible as in going advance. FIGS. 15a and 15b illustrating an astern acceleration are identical to FIGS. 11a and 11b illustrating an advance acceleration, except that the direction therebetween is opposite to each other.

An operation principle of the hybrid system described above indicates how the power converter operates according to each driving state. When actually applying the hybrid system, the hybrid system is not limited to the present embodiment. Various operation methods may be possible according to an engine output, an operation condition, a design demand, etc. Accordingly, it is very important to minutely control an electric motor according to an engine output, so as to optimize fuel efficiency and drive a vehicle as described above. Also, to maximize the efficiency of an engine in a thermodynamic aspect, the corresponding power is needed to maintain a compressed pressure in a gas combustion process. For this, a periodical minute control of an electric motor is also needed. Generally, since reliability and certainty with respect to a control of the electric motor has been approved, the above objectives may be achieved by using an appropriate control algorithm. Also, an electric motor having two independent outputs may be provided in various shapes according to a design demand.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

The present invention may be applied to an improved hybrid vehicle having a reciprocating rotary engine and/or a power converter. Also, the reciprocating rotary engine and the power converter may be applied for a vehicle.

The invention claimed is:

1. A power converter receiving reciprocating rotary motion from a reciprocally rotating engine shaft and converting the reciprocating rotary motion into unidirectional rotary motion, the power converter comprising:
a plurality of input axes connected to an engine;
a plurality of other input axes connected to power combination devices; a plurality of power combination devices each of which has three ends, with a first end being connected to the input axis, a second end to the other input axis, and a third end to the output axis, an output axis of the power converter connected to the plurality of output axes of the power combination devices; and
electric motors, wherein each of said electric motors is connected to each of the plurality of the other input axes.

2. A power converter comprising:
a planet gear carrier with an end connected to an engine shaft to be driven by reciprocating torque according to the reciprocating rotary motion of the engine and including a plurality of planet gears;
a sun gear disposed at a center of said planet gear carrier and engaged with the plurality of planet gears;
a ring gear having teeth on both of its internal and external circumferential surfaces, with the internal circumferential surfaces being engaged with planet gears of said planet gear carrier; an external gear engaged with said external circumferential gear to drive or to be driven by the ring gear; and
a motor-generator dual role electric motor, working as a motor when it rotates said external gear to drive the ring gear, and working as a generator when the external gear is driven by the ring gear,
wherein the motor-generator dual role electric motor modulates the torque of said ring gear periodically via said external gear in accordance with the reciprocating torque that is transferred through the engine shaft and thereby, provides said planet gear carrier with a counterforce to the engine torque.

3. The power converter of claim 2, wherein the planet gear carrier and a drive shaft are engaged with each other by bevel gears.

4. The power converter of claim 2, further comprising:
an electric motor control device adjusting rotational direction and speed of said external gear by controlling the motor-generator dual role electric motor.

5. The power converter of claim 2, further comprising:
a storage battery supplying electricity to the motor-generator dual role electric motor for power generation or receiving electricity therefrom for power storage.

6. A power converter comprising:
a pair of planet gear carriers connected to the drive shaft transferring torque to wheels;
a plurality of freely rotating planet gears fitted to each of said pair of planet gear carriers and;
each of sun gears disposed at a center of each planet gear carrier and engaged with said multiple number of planet gears;
a motor drive shaft connected to each of said sun gears to be driven in the direction identical to that of each sun gear;
each of ring gears having teeth on both of its internal and external circumferential surfaces, with the internal circumferential surfaces being in mesh with planet gears of said planet gear carrier;
an engine shaft connected to both of said ring gears; and
a motor-generator dual role electric motor operating as a motor when driving the sun gear and operating as a generator when driven by the sun gear,
wherein the motor-generator dual role electric motor modulates the torque of said ring gear periodically via said external gear in accordance with the reciprocating torque that is transferred through the engine shaft and thereby, provides said planet gear carrier with a counterforce to the engine torque.

7. The power converter of claim 6, further comprising:
an electric motor control device adjusting rotational direction and speed of said external gear by controlling said motor-generator dual role electric motor.

8. The power converter of claim 6, further comprising:
a storage battery supplying electricity to the motor-generator dual role electric motor for power generation or receiving electricity therefrom for power storage.

9. A hybrid system comprising:
a fuel tank carrying fuel;
a reciprocating rotary engine comprising an engine block having a torus-shaped chamber formed inside and a pair of cross walls and having at least one through hole which is concentrically disposed in a center of the torus chamber, an engine shaft concentrically disposed in the center of the torus chamber and formed with a plurality of pistons and having the torus chamber divided by the cross walls and the pistons;

an engine control device driving the reciprocating rotary engine;

at least two power converters, each of said at least two power converters comprising:

planet gear carriers with a plurality of planet gears, sun gears disposed at a center of planet gear carriers and engaged with the plurality of planet gears, ring gears with inner circumferential gears engaged with said planet gears fitted in the planet gear carriers, external gears engaged with external circumferential gears of the ring gears and driving or being rotated by the ring gear, and a motor-generator dual role electric motor;

wherein said engine shaft simultaneously connected to the ring gears for rotation thereof and the dual role electric motor of said each of said at least two power converters;

an electric motor control device connected to the power converter and adjusting rotational direction and speed of the external gears by controlling said motor-generator dual role electric motors; and a storage battery supplying electricity to the motor-generator dual role electric motors for power generation or receiving electricity therefrom for power storage.

10. The hybrid system of claim 9, wherein said motor-generator dual role electric motors work as follows; in initial start mode both of said motor-generator dual role electric motors work as motors, in cruise mode one of said motor-generator dual role electric motors with the lower speed works as a motor and the other of said motor-generator dual role electric motor with the higher speed works as a generator, in deceleration and idling modes both of said motor-generator dual role electric motors work as generators.

11. A hybrid system comprising:

a reciprocating rotary engine generating a reciprocating rotary motion; a power converter converting said reciprocating rotary motion into unidirectional rotary motion; and an engine control device controlling said reciprocating rotary engine, wherein the reciprocating rotary engine comprises an engine block having a torus-shaped chamber formed inside; an engine shaft concentrically disposed at a center of the torus chamber; a pair of cross walls disposed in the torus chamber to face each other and dividing the torus chamber into two regions; and a pair of pistons, symmetrically disposed on the outer circumferential surface of the engine shaft, one in each region of the divided torus chamber, the torus-shaped chamber is divided into four regions by said cross walls and said pistons, and intake, compression, expansion and exhaustion are simultaneously take place and 4-strokes are executed in one cycle while the piston oscillates twice, and wherein the power converter comprises a pair of planetary gear units including sun gears, planet gear carriers, and ring gears and disposed to face each other with the engine shaft of said reciprocating rotary engine in the middle; a pair of motor-generator dual role electric motors, each driving an external gear or utilizing the torque of said external gear for electricity; an electric motor control device to drive the motor-generator dual role electric motors, and the sun gears are simultaneously connected to the drive shaft passing through the center of two planetary gear units and driven in the direction identical to that of sun gears, and said each motor-generator dual role electric motor modulates the torque of a respective one of said ring gears periodically via said external gear in accordance with the reciprocating torque that is transferred through the engine shaft and thereby, provides said planet gear carrier with a counterforce to the engine torque.

12. The hybrid system of claim 11, wherein said motor-generator dual role electric motors work as motors in initial start mode, in cruise mode one of said motor-generator dual role electric motors with the lower speed works as a motor and a faster one of said of said motor-generator dual role electric motors as a generator, and in the case of deceleration and idling modes both of said of said motor-generator dual role electric motors work as generators.

13. A hybrid system comprising:

a fuel tank carrying fuel;

a reciprocating rotary engine comprising an engine block having a torus-shaped chamber formed inside and a pair of cross walls and having at least one through hole which is concentric to the center of the torus chamber, and an engine shaft concentrically disposed at a center of the torus chamber and formed in one body with a plurality of pistons and having the torus chamber divided by the cross walls and the pistons;

an engine control device driving the reciprocating rotary engine;

a power converter comprising planet gear carriers with a plurality of planet gears, sun gears disposed at a center of planet gear carriers and engaged with the plurality of planet gears, ring gears with their inner circumferential gear engaged with said planet gears fitted in the planet gear carriers, external gears engaged with external circumferential gears of the ring gears and driving or being rotated by the ring gear; and motor-generator dual role electric motors;

an electric motor control device connected to the power converter and adjusting rotational direction and speed of the external gears by controlling said motor-generator dual role electric motors; and a storage battery supplying electricity to the said motor-generator dual role electric motors for power generation or receiving electricity therefrom for power storage.

14. The hybrid system of claim 13, wherein said motor-generator dual role electric motors work as follows; in initial start mode both of said motor-generator dual role electric motors work as motors, in cruise mode one of said motor-generator dual role electric motors with the lower speed works as a motor and the other of said motor-generator dual role electric motors with the higher speed works as a generator, in deceleration and idling modes both of said motor-generator dual role electric motors work as generators.

* * * * *